United States Patent Office 3,674,558
Patented July 4, 1972

3,674,558
BLEACHING OF CLAYS
Peter James Malden, Cornwall, England, assignor to English Clays Lovering Pochin & Company Limited, Cornwall, England
No Drawing. Filed May 7, 1970, Ser. No. 35,592
Claims priority, application Great Britain, May 16, 1969, 25,216/69
Int. Cl. B03b 7/00; B08b 5/00; C09c 1/42
U.S. Cl. 134—2                                    10 Claims

ABSTRACT OF THE DISCLOSURE

A method of bleaching a clay which comprises contacting a dry, or substantially dry, particulate mass of the clay with a gas comprising ozone.

BACKGROUND OF THE INVENTION

This invention relates to the bleaching of clays and, more particularly but not exclusively, is concerned with a method of bleaching kaolinitic clays.

It is well known to improve the brightness of clays, e.g. kaolinitic clays, by bleaching the clay in aqueous suspension with a reducing bleaching agent. It has also been proposed, see for example U.S. patent specification No. 3,353,668, to bleach the so-called grey kaolins by (a) forming an aqueous slip, or suspension, consisting essentially of water, the grey kaolin and an oxidising bleaching agent which is a water-soluble inorganic compound containing molecularly-available oxygen, (b) agitating said slip, or suspension, until oxidation takes place, and (c) thereafter subjecting the aqueous slip, or suspension, of the kaolin clay to the action of a reducing bleaching agents. However, the improvement in the brightness of the grey kaolin which is obtained with such a process is in many cases very small. Moreover, the time required to achieve the desired result is long, and it is necessary to dewater the grey kaolin after treatment with the oxidising and reducing bleaching agents.

It is an object of the present invention to provide a method of bleaching clays which obviates the above disadvantages.

SUMMARY OF THE INVENTION

Accordingly, the invention provides a method of bleaching a clay which comprises contacting a dry, or substantially dry, particulate mass of the clay with a gas comprising ozone.

By the term "substantially dry" there is meant herein that the particles of clay are sufficiently dry to flow as a powder; in general, this will mean that the clay will contain less than 15% by weight of water. In general, the finer the clay the more water there can be present without affecting the ability of the clay particles to flow as a powder.

DESCRIPTION OF THE PREFERRED EMBODIMENTS

The gas comprising ozone can be, for example, ozonised air or ozonized oxygen which will generally contain from 0.1% to 15.0% by volume of ozone.

The particulate mass of clay can be contacted with the gas comprising ozone in any reactor designed to give good gas-solid contact. However, it is preferred to contact the clay with the gas in a fluidised bed which is advantageously of the dense-phase type. It is also preferred to contact the clay with the gas at a substantially constant volume rate of flow. The optimum volume rate of flow of the gas will depend inter alia on whether a fixed bed or a fluidised bed reactor is used, but in any case will generally be at least 100 ml. of gas per minute per 100 grams of dry clay and generally not more than 2000 ml. of gas per minute per 100 gm. of dry clay.

The gas comprising ozone is contacted with the dry or substantially dry clay for a time sufficient to obtain a significant increase in the brightness of the clay. The lower the ozone concentration in the gas the longer is the period of treatment required to bring about a desired brightness increase. In general, it is found that the gas should be passed through the dry or substantially dry clay for a time ranging from 5 minutes to one hour. The temperature at which the gas is contacted with the clay is preferably in the range 10° C. to 30° C., most preferably room temperature. At temperatures below 10° C. the desired bleaching reaction is very slow whilst at temperatures above 30° C. decomposition of ozone becomes appreciable.

It has been found to be advantageous for the clay to contain from 1 to 5% by weight of water.

The method of the invention is of particular value for the treatment of kaolinitic clays, for example the so-called grey kaolins which are naturally of fine particle size, i.e. a major proportion consists of particles smaller than 2 microns equivalent spherical diameter, but it can also be used for increasing the brightness of kaolinitic clays in general and also other clays, e.g. bentonite, attapulgite, pyrophyllite and halloysite. When treating coarse clays the bleaching of the clay with with ozone is advantageously carried out immediately after a dry grinding process in which there is formed a dry, or substantially dry, mixture of the clay and a particulate grinding medium, wherein the particulate grinding medium consists essentially of particles ranging in size from 150 microns to ¼ inch and wherein the weight ratio of particulate grinding medium to clay is in the range of from 2:1 to 5:1, said mixture is agitated for a time sufficient to reduce the clay to the desired particle size, the agitated mixture being maintained at a temperature sufficiently low to ensure that the particles of clay do not agglomerate, and thereafter the ground clay is separated from the particulate grinding medium. The invention is illustrated by the following examples.

Example 1

Samples of kaolinitic clays from various sources were first dried and milled in a laboratory Raymond mill and 10 gm. of each milled clay were then placed in a Drechsel wash bottle. Ozonised oxygen, containing 2% by volume of ozone, was passed through a fixed bed of the milled clay in the wash bottle for 30 minutes at 20° C. at the rate of 133 ml. of ozonised oxygen per minute. Clay samples Nos. 1 to 5 were grey kaolins from various sources in Georgia, U.S.A., and clay sample No. 6 was an English china clay which had first been classified to give a product which consisted substantially wholly of particles smaller than 5 microns equivalent spherical diameter (e.s.d.). The table below gives the proportion by weight of each clay which consisted of particles smaller than 2 microns e.s.d., and the reflectances to light of 458 and 574 millimicrons wavelength respectively before and after treatment.

TABLE

| Clay Sample Number | Percent by wt. of particles smaller than 2 microns | Before treatment: percent reflectance to light having a wavelength of— | | After treatment: percent reflectance to light having a wavelength of— | |
|---|---|---|---|---|---|
| | | 458 m$\mu$ | 574 m$\mu$ | 458 m$\mu$ | 574 m$\mu$ |
| 1 | 82 | 81.5 | 87.8 | 85.5 | 91.3 |
| 2 | 77 | 76.0 | 79.8 | 80.4 | 83.7 |
| 3 | 80 | 76.2 | 83.2 | 82.2 | 88.4 |
| 4 | 79 | 79.2 | 86.6 | 82.5 | 90.0 |
| 5 | 81 | 78.2 | 85.0 | 81.1 | 88.0 |
| 6 | 79 | 89.0 | 92.8 | 90.5 | 93.8 |

Example 2

Three samples, A, B and C, of kaolinitic clays from different parts of Georgia, U.S.A., were first dried and milled in a laboratory Raymond mill and 10 gm. of each milled clay were then placed in a Drechsel wash bottle. Each dry-milled clay sample consisted entirely of particles smaller than 5 microns equivalent spherical diameter and contained about 90% by weight of particles smaller than 2 microns equivalent spherical diameter. Each sample of the dry-milled clay was divided into two portions and each portion was then treated in the form of a fixed bed with ozonised oxygen at 20° C. at the rate of 133 ml. of ozonised oxygen per minute, one portion being treated with ozonised oxygen containing 0.2% by volume of ozone and the other portion being treated with ozonised oxygen containing 2.0% by volume of ozone. The bleaching effect obtained after various time intervals was measured. Tables IIA, IIB and IIC below give the percentage reflectances to light of 458 and 574 millimicrons respectively for clays A, B and C respectively before and after treatment with the two streams of ozonised oxygen for varying lengths of time.

TABLE IIA

| Treatment time (minutes) | 0.2% v./v. ozone: percent reflectance to light having a wavelength of— | | 2.0% v./v. ozone: percent reflectance to light having a wavelength of— | |
| --- | --- | --- | --- | --- |
| | 458 mμ | 574 mμ | 458 mμ | 574 mμ |
| 0 | 82.2 | 87.6 | 82.2 | 87.6 |
| 5 | 84.7 | 90.2 | 85.6 | 91.0 |
| 10 | 85.2 | 90.7 | 86.0 | 91.2 |
| 15 | 85.3 | 90.8 | 86.2 | 91.4 |
| 30 | 85.5 | 91.0 | 86.2 | 91.4 |

Example 3

A further three portions a, b and c of Clay B (as used in Example 2) were treated in the following ways: Portion a was dried at 80° C. for four hours and was then milled in a laboratory Raymond mill. The moisture content was measured and found to be 1% by weight of water. Portion b was dried at 80° C. for 24 hours and was then left for 3 days in a desiccator over phosphorus pentoxide. The moisture content was measured and this portion was found to be completely dry. Portion c, was suspended in water to give a suspension containing 15% by weight of solids and the pH of the suspension was then adjusted to 8.0 with sodium hydroxide in order to deflocculate the clay.

10 gm. of each of the dry, or substantially dry, clay prepared from portions a and b were placed in separate Drechsel wash bottles and ozonised oxygen containing 0.2% by volume of ozone was passed through the milled clay in the wash bottles at 20° C. and at the rate of 133 ml. of ozonised oxygen per minute. The bleaching effect achieved after various time intervals was measured.

80 ml. of the suspension of portion c were placed in a Friedrich gas washer and ozonised oxygen containing 0.2% by volume of ozone was bubbled through the suspension at 20° C. and at the rate of 133 ml. of ozonised oxygen per minute. The bleaching effect achieved after various time intervals was measured.

Table III below gives the percentage reflectance to light having a wavelength of 458 and 574 millimicrons for the portions of clay when bleached with the ozonised oxygen in the presence of varying amounts of water and for varying lengths of time.

TABLE III

| Percent reflectance to light having a wavelength of— | 0% moisture | | 1.0% moisture | | 15% solids | |
| --- | --- | --- | --- | --- | --- | --- |
| | 458 mμ | 574 mμ | 458 mμ | 574 mμ | 458 mμ | 574 mμ |
| Treatment time (min.): | | | | | | |
| 0 | 78.2 | 85.2 | 78.0 | 85.1 | 78.0 | 85.1 |
| 5 | 81.5 | 88.4 | 81.4 | 88.2 | 78.6 | 85.5 |
| 10 | 82.0 | 88.9 | 82.4 | 89.4 | 79.1 | 86.0 |
| 15 | 81.9 | 89.0 | 82.6 | 89.2 | 79.6 | 86.4 |

TABLE IIB.—CLAY B

| Treatment time (minutes) | 0.2% v./v. ozone: percent reflectance to light having a wavelength of— | | 2.0% v./v. ozone: percent reflectance to light having a wavelength of— | |
| --- | --- | --- | --- | --- |
| | 458 mμ | 574 mμ | 458 mμ | 574 mμ |
| 3 | 78.0 | 85.1 | 78.0 | 1 |
| 0 | 81.4 | 88.2 | 83.0 | 89.5 |
| 50 | 82.4 | 89.1 | 83.4 | 89.7 |
| 15 | 82.6 | 89.2 | 83.5 | 89.8 |
| 10 | 83.0 | 89.6 | 83.7 | 90.0 |

TABLE IIC.—CLAY C

| Treatment time (minutes) | 0.2% v./v. ozone: percent reflectance to light having a wavelength of— | | 2.0% v./v. ozone: percent reflectance to light having a wavelength of— | |
| --- | --- | --- | --- | --- |
| | 458 mμ | 574 mμ | 458 mμ | 574 mμ |
| 0 | 75.3 | 81.9 | 75.3 | 81.9 |
| 5 | 79.5 | 85.9 | 81.2 | 87.0 |
| 10 | 80.1 | 86.4 | 81.5 | 87.1 |
| 15 | 80.3 | 86.6 | 81.7 | 87.3 |
| 30 | 80.8 | 86.9 | 81.8 | 87.5 |

I claim:

1. A method of bleaching a clay which comprises (a) forming a particulate mass of the clay as a free flowing powder containing less than 15% by weight of water and (b) contacting said particulate mass of clay with a gas comprising ozone.

2. A method according to claim 1, wherein the clay contains from 1 to 5% by weight of water.

3. A method according to claim 1, wherein the particulate mass of clay is formed into a fluidised bed through which the gas comprising zone is passed.

4. A method according to claim 1, wherein the particulate mass of the clay is contacted with the gas comprising ozone for a time ranging from 5 minutes to one hour and at a temperature in the range 10° C. to 30° C.

5. A method according to claim 1, wherein the clay is ground so as to consist of particles smaller than 5 microns equivalent spherical diameter before it is contacted with the gas comprising ozone.

6. A method according to claim 1, wherein the clay is completely dry.

7. A method according to claim 1, wherein the gas comprising ozone is ozonised air or ozonised oxygen containing from 0.1% to 15% by volume of ozone.

8. A method according to claim 7, wherein the ozonised air or ozonised oxygen is contacted with the clay at a rate in the range of from 100 to 200 ml. of gas per minute per 100 gm. of dry clay.

9. A method of bleaching a kaolinitic clay which comprises (a) forming a substantially dry particulate mass of the kaolinitic clay containing from 1% to 5% by weight of water and (b) contacting said substantially dry particulate mass of kaolinitic clay with ozonised air or ozonised oxygen containing from 0.1% to 15% by volume of ozone at a temperature in the range of 10° C. to 30° C. for a time ranging from 5 minutes to one hour.

10. A method according to claim 9, wherein the ozonised air or ozonised oxygen is contacted with the clay at a rate in the range of from 100 to 2000 ml. of gas per minute per 100 gm. of dry clay.

References Cited

UNITED STATES PATENTS

| | | | |
|---|---|---|---|
| 3,503,499 | 3/1970 | Allegrini et al. | 106—288 B X |
| 3,353,668 | 11/1967 | Duke | 106—288 B X |

MORRIS O. WOLK, Primary Examiner

J. T. ZATARGA, Assistant Examiner

U.S. Cl. X.R.

23—110 P; 106—288 B; 134—25 R

UNITED STATES PATENT OFFICE
CERTIFICATE OF CORRECTION

Patent No. 3,674,558　　　　　　　　　Dated July 4, 1972

Inventor(s) PETER JAMES MALDEN

It is certified that error appears in the above-identified patent and that said Letters Patent are hereby corrected as shown below:

Column 5, line 3, change "200" to --2000--

Signed and sealed this 3rd day of December 1974.

(SEAL)
Attest:

McCOY M. GIBSON JR.　　　　　　　C. MARSHALL DANN
Attesting Officer　　　　　　　　Commissioner of Patents